United States Patent [19]

Ryskamp

[11] Patent Number: 4,726,894

[45] Date of Patent: Feb. 23, 1988

[54] DISTILLATION CUT POINT CONTROL

[75] Inventor: Carroll J. Ryskamp, Foxboro, Mass.

[73] Assignee: The Foxboro Company, Foxboro, Mass.

[21] Appl. No.: 935,089

[22] Filed: Nov. 24, 1986

Related U.S. Application Data

[63] Continuation of Ser. No. 813,692, Dec. 27, 1985, abandoned, which is a continuation of Ser. No. 703,277, May 3, 1985, abandoned.

[51] Int. Cl.$^4$ ................................................ C10G 7/00
[52] U.S. Cl. ............................ 208/347; 208/DIG. 1; 203/1; 203/3
[58] Field of Search ............... 208/347, 354, 355, 364, 208/DIG. 1; 203/1, 2, 3

[56] References Cited

U.S. PATENT DOCUMENTS

| 2,798,031 | 7/1957 | Irvine | 208/355 |
| 3,297,566 | 1/1967 | Moyer et al. | 208/355 |
| 3,320,158 | 5/1967 | Potts | 208/355 |
| 3,365,386 | 1/1968 | Van Pool | 208/355 |
| 3,567,628 | 3/1971 | Van Pool | 208/355 |

OTHER PUBLICATIONS

"Applied Hydrocarbon Thermodynamics", Edminster, Chapter 2, Gulf Publishing Co, 1981.

Primary Examiner—Helen M. S. Sneed
Assistant Examiner—Glenn Caldarola

[57] ABSTRACT

Cut point is controlled in a distillation process by monitoring the partial pressure in a stripper.

8 Claims, 2 Drawing Figures

DISTILLATION CUT POINT CONTROL

This is a continuation of co-pending application Ser. No. 813,692 filed on Dec. 27, 1985, now abandoned which is a continuation of application Ser. No. 6/703,277, abandoned.

FIELD OF THE INVENTION

This invention relates to removal of cuts from mixtures of liquids, and more particularly to cut point control in petroleum crude towers.

BACKGROUND OF THE INVENTION

It has been known to correlate side draw temperatures with cut points through simultaneous monitoring of numerous tower parameters (e.g., Nelson, "Petroleum Refinery Engineering", McGraw-Hill, Fourth Ed. 1958, 473 ff).

SUMMARY OF THE INVENTION

I have discovered that the cut point between any heavier cut to be withdrawn and lighter material may be controlled based on parameters around simply the bottom tray of a stripper for said heavier cut.

In particular, I have discovered that said cut point may be controlled through use of a characteristic of the liquid in said bottom tray.

In a preferred embodiment, said characteristic is the partial pressure of said liquid.

In a further preferred embodiment, said characteristic is the initial boiling point of the equilibrium flash vaporization curve ("IBP/EFV") of said liquid at atmospheric pressure.

By "cut point", I mean that temperature (in °F.) on a true boiling point ("TBP") curve (i.e., a batch process curve of percent of mixture—e.g., crude oil—removed in a heavily refluxed tower versus temperature reached to achieve that removal at which a predetermined degree of separation is reached).

PREFERRED EMBODIMENT

I turn now to a description of the drawings, and of a preferred embodiment of the invention.

STEPS

Figure 1:
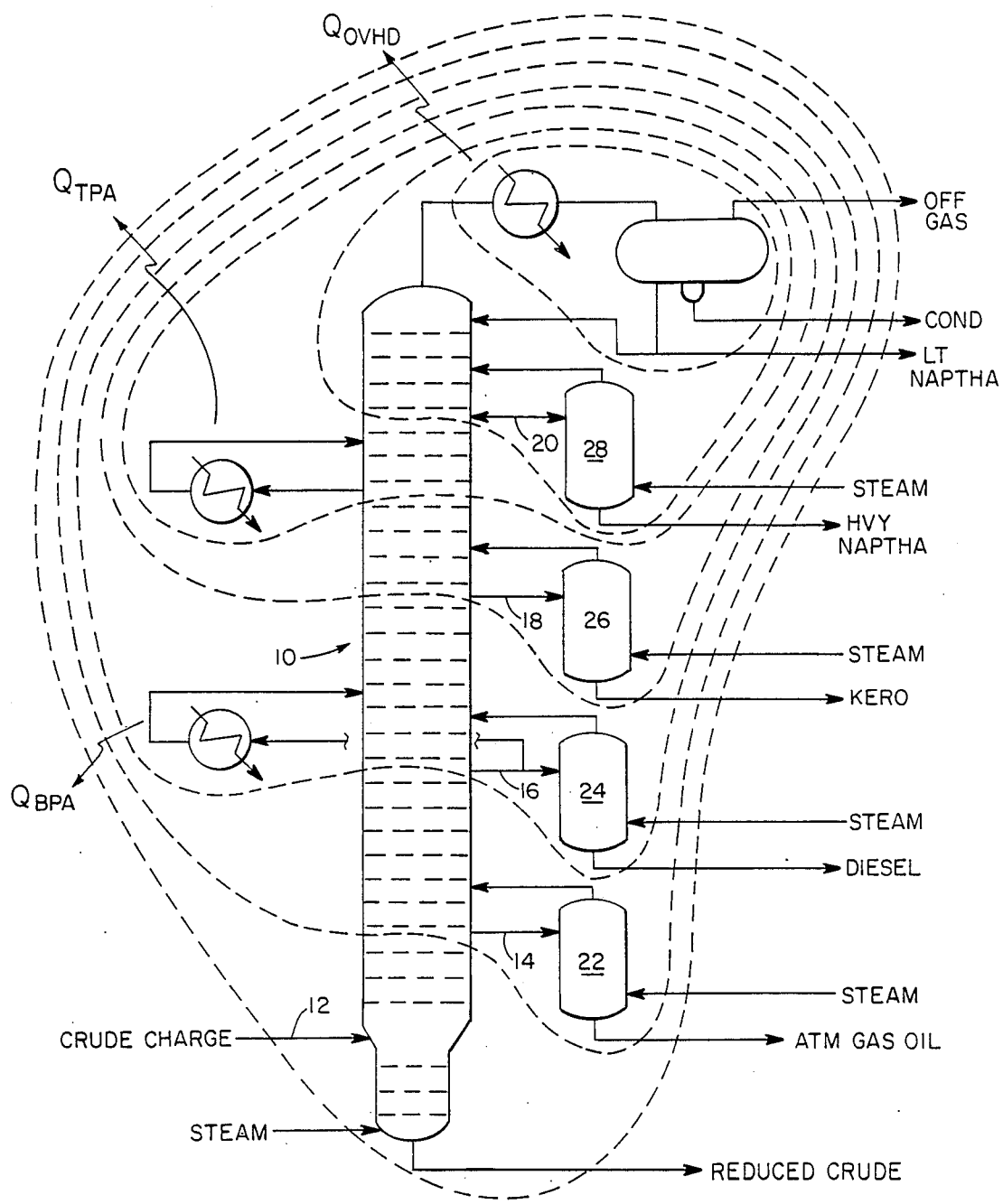
FIG. 1 is a diagrammatic view with respect to practice of the method.

A crude tower of conventional arrangement, as shown in FIG. 1, and indicated generally at 10, and containing about fifty plates, was continuously supplied with heated crude oil through line 12. Emerging from tower 10 in order up its height were draw lines 14 (for atmospheric gas oil), 16 (for diesel oil), 18 (for kerosene), and 20 (for heavy naphtha). Said draw lines fed respectively into strippers 22, 24, 26, and 28 above the top plate of each thereof (each stripper having about six plates).

It was decided in advance that composition ranges desired to be manufactured would call for cut points between the atmospheric gas oil and diesel oil of 704°, between diesel oil and kerosene of 492°, and between kerosene and heavy naphtha of 322°. My invention was used to maintain and control at these predetermined cut points (all temperatures mentioned in this document Fahrenheit) each of the three.

The invention may be explained in particular detail with respect to the cut point between diesel oil and kerosene.

At startup, temperature in the draw tray from which draw line 16 emerged was monitored until about that expected to be associated with the desired cut point, about 515°.

My control method was then used to regulate actual cut point.

The following measurements were taken, then, each minute:

(1) Steam flow to stripper 24 (lbs./hr.)
(2) Diesel oil flow from bottom of stripper 24 (barrels/day)
(3) Temperature in diesel oil draw line 16
(4) Temperature of diesel oil flowing from bottom of stripper 24
(5) Pressure in stripper 24 (treated as that at draw tray from which draw line 16 emerges, and determined by interpolating between bottom and top pressures of tower 10)
(6) Temperature of steam into stripper 24
(7) Pressure of steam into stripper 24.

Using these seven measurements, together with constants from laboratory data to give enthalpy, partial pressure of diesel oil ("liquid") in the vapor above the bottom plate of stripper 24 is obtained by performing a heat and mass balance around the bottom plate, employing calculations that are well known in the art; this is then used to determine atmospheric pressure IBP/EFV of the diesel oil. In making this determination, constants are desirably used which from most recent (usually daily) laboratory data update the apex of the two-phase region triangle defined by plotting EFV's for various vaporization percentages as shown in FIG. 3B3.1 of API Technical Data Book (August, 1963), pressure versus temperature graphs for each percentage mixture being a straight line.

Figure 3:
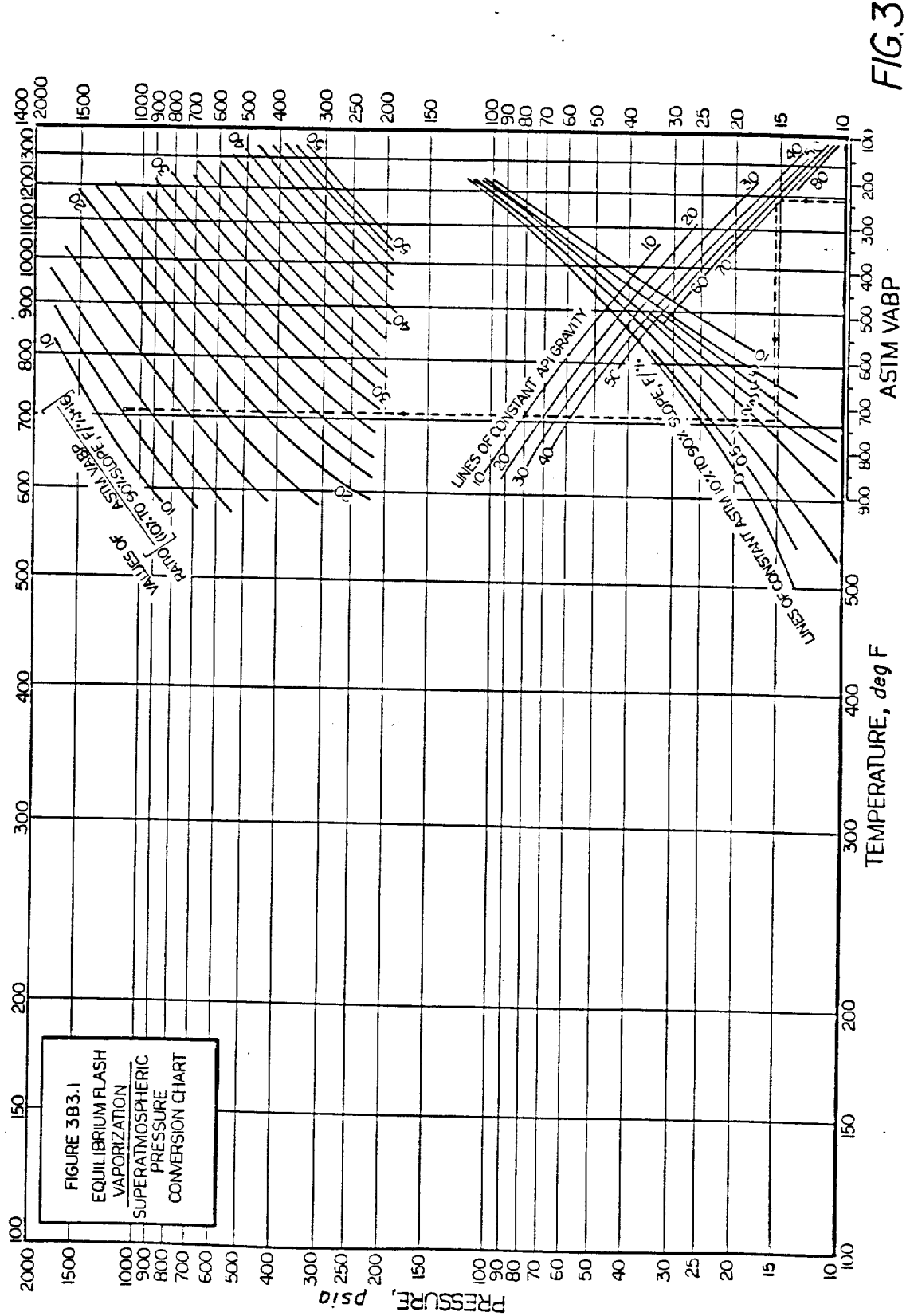
FIG. 3 is a graph for contructing equilibrium flash vaporization curves for use in the practice of the method.

FIG. 3B3.1 of the API Technical Data Book is reproduced herein as FIG. 3. In using the graph of FIG. 3 one obtains the temperatures for 10%, 30%, 50%, 70%, and 90% distillation ($T_{10}$, $T_{30}$, $T_{50}$, $T_{70}$, and $T_{90}$, respectively) using ASTM D86, and also obtains the API gravity. ASTM slope (10 to 90 percent) is given by ($T_{10}-T_{90}$)/80. ASTM volume average boiling point (VABP) is given by ($T_{10}+T_{30}+T_{50}+T_{70}+T_{90}$)/5. The "ratio" is given by ASTM VABP/(ASTM slope (10 to 90 percent)+16). Using FIG. 3, one starts at the bottom right-hand corner and plots a vertical line at the ASTM VABP. Where this vertical line intersects the appropriate API gravity line, one plots a horizontal line. Where this horizontal line intersects the appropriate ASTM slope (10 to 90 percent) line, one plots a vertical line. The apex is where this vertical line intersects the appropriate ratio line. (Since partial pressure of the diesel oil and the temperature of the diesel oil on the bottom tray of stripper 24 define one point on the initial boiling point—i.e., 100% liquid, "IBP"—line and the apex the other, the atmospheric IBP/EFV may be easily picked off.)

Figure 2:
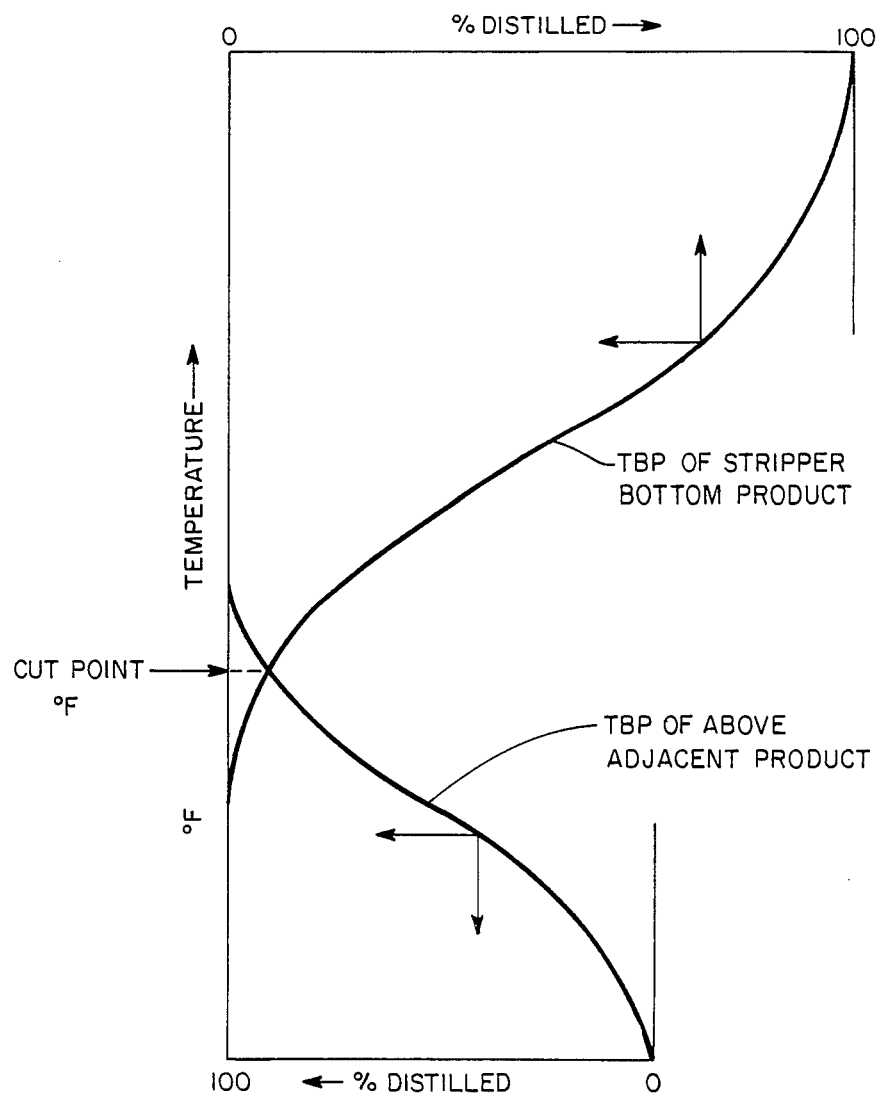
FIG. 2 is a pair of curves intersecting to give a cut point.

Once daily the laboratory supplied an ASTM curve of temperature versus percent vaporized, for both the diesel oil and the kerosene. Using conventional conversions, these permitted establishment of true boiling point curves for each. Using these, plotted over widths reflecting their relative volumes (barrels/day), and with the kerosene curve flipped, all as shown in FIG. 2, an intersection results at a temperature which is the cut point.

The difference between this TBP cut point temperature and the IVP/EFV temperature for the same daily sample gives a correction factor that may be used with the process IBP/EFV temperature to provide the running (minute by minute) cut point.

If the measured cut point is not exactly that desired, the flow rates in draw lines 16 and 18 are appropriately varied, in equal but opposite amounts, using flow rate controllers 30 according to procedures that are well known in the art to adjust actual cutpoint.

In the same manner, the cut point between atmospheric gas oil and diesel oil was controlled using stripper 22 as the focus of control in the same way as was stripper 24 in the control above described, and, in the same way, the cut point between kerosene and heavy naphtha was controlled using stripper 26 as the focus of control. The cut point between heavy naphtha and light naphtha was controlled by prior art methods, although the method of my invention could of course have been used.

Other embodiments of the invention within the following claims will occur to those skilled in the art.

I claim:

1. In a process including a multidraw distillation main column and a side stripper column receiving a draw from said main column, the method of controlling the composition of a liquid product in a product removal line at the bottom of one said distillation column, said one column having an input line, a stripping vapor inlet line, a plurality of trays, and an overhead vapor removal line, distillation processes being carried out in said columns, said method comprising calculating the partial pressure of components vaporized from liquid at the bottom of said one column, monitoring the temperature of liquid at the bottom of said one column, calculating by standard calculation techniques the initial boiling point (IBP) of the liquid at the bottom of said one column using said partial pressure and temperature to obtain calculated composition, comparing said calculated composition with a set point composition, and adjusting said distillation process in said one column so as to approach said set point composition.

2. The method of claim 1 wherein said one column is said stripper column, and said overhead vapor removal line is connected to return vaporized components to said multidraw column.

3. The method of claim 1 wherein said IBP is the IBP of the equilibrium flash vaporization (EFV) curve.

4. The method of claim 3 wherein said IBP of said EFV is at atmospheric pressure.

5. The method of claim 1 wherein said adjusting comprises adjusting the flow in said lines.

6. The method of claim 2 wherein there are additional stripper columns having input lines receiving draws from said multidraw column, and further comprising carrying out said partial pressure calculation, temperature monitoring, IBP calculation, composition comparison, and adjusting steps at said additional stripper columns.

7. The method of claim 6 wherein said adjusting comprises adjusting the flow in said lines.

8. The method of claim 2 wherein said multidraw column receives crude oil.

* * * * *

UNITED STATES PATENT OFFICE
CERTIFICATE OF CORRECTION

Patent No. __4,726,894__        Dated __February 23, 1988__

Inventor(s) __Carroll J. Ryskamp__

It is certified that error appears in the above-identified patent and that said Letters Patent are hereby corrected as shown below:

Column 1, line 7, "6/703,277" should be --6/730,277--; and

Figure 3 should be added as shown on the attached sheet.

On the Title Page, "2 Drawing Figures" should read -- 3 Drawing Figures --.

Signed and Sealed this

Fourth Day of October, 1988

Attest:

DONALD J. QUIGG

Attesting Officer      Commissioner of Patents and Trademarks